(12) United States Patent
Ricci et al.

(10) Patent No.: US 8,527,373 B1
(45) Date of Patent: Sep. 3, 2013

(54) FULFILLMENT OF ORDERS

(75) Inventors: Christian M. Ricci, Issaquah, WA (US); Rory D. Fish, Bellevue, WA (US); David L. Ballenger, Kirkland, WA (US)

(73) Assignee: Amazon Technologies, Inc., Reno, NV (US)

(*) Notice: Subject to any disclaimer, the term of this patent is extended or adjusted under 35 U.S.C. 154(b) by 290 days.

(21) Appl. No.: 12/132,729

(22) Filed: Jun. 4, 2008

Related U.S. Application Data (60) Provisional application No. 61/038,610, filed on Mar. 21, 2008.

(51) Int. Cl.
| | | |
|---|---|---|
| G06Q 10/00 | (2012.01) | |
| G06G 1/14 | (2006.01) | |
| G06Q 20/00 | (2012.01) | |
| G06Q 30/00 | (2012.01) | |

(52) U.S. Cl.
USPC .............................. 705/28; 705/22; 705/26.1

(58) Field of Classification Search
USPC ..................................................... 705/22–28
See application file for complete search history.

(56) References Cited

U.S. PATENT DOCUMENTS

| | | | | |
|---|---|---|---|---|
| 7,295,990 | B1* | 11/2007 | Braumoeller et al. | 705/7.31 |
| 2002/0133387 | A1* | 9/2002 | Wilson et al. | 705/8 |
| 2002/0178074 | A1* | 11/2002 | Bloom | 705/26 |
| 2003/0171962 | A1* | 9/2003 | Hirth et al. | 705/7 |
| 2003/0172007 | A1* | 9/2003 | Helmolt et al. | 705/28 |
| 2004/0111286 | A1* | 6/2004 | Koenig et al. | 705/1 |
| 2006/0136237 | A1* | 6/2006 | Spiegel et al. | 705/1 |
| 2006/0149640 | A1* | 7/2006 | Gordon et al. | 705/26 |

* cited by examiner

*Primary Examiner* — Ig T An
(74) *Attorney, Agent, or Firm* — Thomas|Horstemeyer, LLP (57) ABSTRACT

Disclosed are various embodiments for generating orders for inventory items that are fulfilled from a physical fulfillment network of a merchant. A fulfillment network model is maintained in at least one server, the fulfillment network model comprising an abstraction of a physical fulfillment network operated by a merchant, the physical fulfillment network being configured for multi-channel delivery. An e-commerce application is maintained for the merchant on the at least one server. An order for an inventory item is generated in the e-commerce application based upon interaction with a client. A fulfillment manifest is generated based upon the fulfillment network model, the fulfillment manifest identifying at least one action to be taken in the physical fulfillment network to implement fulfillment of the order.

37 Claims, 3 Drawing Sheets

FULFILLMENT OF ORDERS

CROSS REFERENCE TO RELATED APPLICATIONS

This Patent Application claims priority to U.S. Provisional Patent Application No. 61/038,610 filed on Mar. 21, 2008 and entitled "FULFILLMENT OF ORDERS," which is incorporated herein by reference in its entirety.

BACKGROUND

Various brick and mortar merchants sell products in stores. It can be difficult to leverage inventory in a distribution network for stores in order to implement order fulfillment for sales that occur in a networked environment.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

Figure 1:
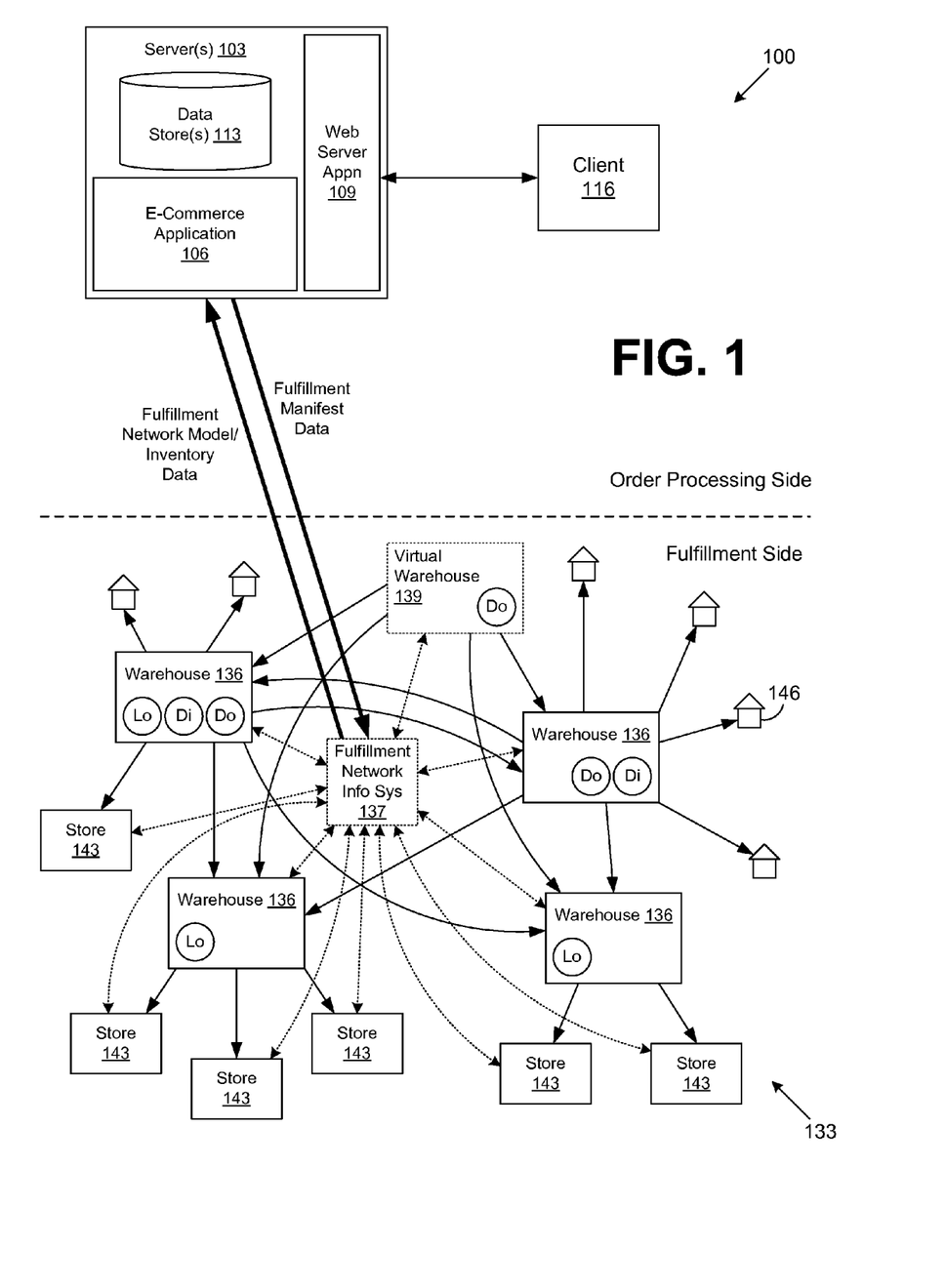
FIG. 1 is a drawing of a product purchase system according to an embodiment of the present disclosure.

With reference to FIG. 1, shown is an order processing side and a fulfillment side of a product purchasing system 100 associated with a merchant according to various embodiments. In this respect, the merchant may sell products through brick and mortar stores, through telephone or catalog sales, and may also sell products online via a presence on the Internet or other network as will be described.

The order processing side involves the taking and processing of online orders for goods as will be described. The fulfillment side involves fulfilling a purchase order for goods by virtue of inventory stored, transferred, and shipped from and between various warehouses, stores, and other shipping or fulfillment sites as will be described. It may be the case that a single entity owns and operates both the order processing side and the fulfillment side of the product purchasing system. Alternatively, it may be the case that a first entity implements the order processing side, and a second entity operates the fulfillment side. Such entities may comprise, for example, companies, corporations, or other entities as can be appreciated.

The order processing side may comprise, for example, one or more servers 103 upon which various applications are executed such as, for example, an e-commerce application 106, web server applications 109, and data stores 113. The server 103 is coupled to a plurality of clients 116 over one or more networks. Such a network may comprise, for example, the Internet, intranets, wide area networks (WANs), local area networks, wireless networks, or other suitable networks, etc., or any combination of two or more such networks.

The e-commerce application 106 is executed in order to facilitate the online purchase of goods over various networks such as, for example, the Internet or other network as can be appreciated. The e-commerce application 106 also performs various back end functions associated with the online presence of a merchant in order to facilitate the online purchase of items. For example, the e-commerce application 106 may generate network pages such as web pages or other types of network content that is provided to a client 116. The Web server applications 109 are representative of various applications that facilitate access to the e-commerce application 106 by clients 116. Web server applications 109 may facilitate browser access to the e-commerce application 106 as can be appreciated. Alternatively, other applications may be employed beyond a web application.

The network content that is supplied to the client 116 by the e-commerce application 106 is provided in response to requests received from the client 116 in the server 103 during interaction between the e-commerce application 106 and the client 116 as the client 116 navigates through the various pages of a network site associated with the online presence of a merchant. The e-commerce application 106 may be configured to dynamically generate such network pages using information in a data store 113 or information obtained from other locations as can be appreciated. Ultimately, the web server application 109 is an example of a server application that acts as a portal through which the client 116 sends requests that are processed by the e-commerce application 106. The responses to the client requests generated by the e-commerce application 106 are received by the client 116 from the e-commerce application 106 through the web server application 109 as can be appreciated.

The various data stored in the data store 113 may comprise, for example, information relating to products offered for sale to those who would manipulate the client 116 such as, for example, product information, product pricing, the availability of the product (in terms of quantities available), the lead times within which such items can be shipped or otherwise made available to the purchaser, and other information as is needed.

In addition, the data store 113 may include a fulfillment network model and inventory data received from the fulfillment side. In particular, the fulfillment side includes various warehouses 136, stores 143, and other fulfillment sites that operate as a fulfillment network 133. The fulfillment network model data stored in the data store 113 is received from the information technology employed to operate the fulfillment network 133 or is supplied by the operators of the fulfillment network 133 to be included in the data store 113. Such information technology may comprise, for example, a centralized fulfillment network information system 137 that includes servers, computer systems, or other systems that are in data communication with the server 103. The centralized fulfillment network information system 137 may communicate with information systems associated with each site of the fulfillment network 133. Alternatively, the information systems of the fulfillment network 133 may be decentralized. The fulfillment network model data and the inventory data may be received in the server 103 from a central source via a single feed (as shown), or from multiple sources distributed throughout the fulfillment network 133. The fulfillment network model data comprises an abstraction of the various facilities in the fulfillment network 133 as well as the actions, cost information, and capabilities of these facilities.

The information technology of the fulfillment network 133 may be configured to communicate with the server 103 to provide data that indicates the current status of the inventory of items stored in the fulfillment network 133. The inventory data provides a current snapshot of the inventory of items located in each of the facilities associated with the fulfillment network 133. In addition, there is other data that may be provided by the fulfillment network to the server 103.

The e-commerce application 106 is further configured to send fulfillment manifest data to various systems associated with the fulfillment network 133 in association with orders for goods made by the client 116. Each fulfillment manifest expressed in the fulfillment manifest data is provided to the fulfillment network 133 to direct the operation of the fulfillment network 133 in fulfilling various orders for goods as will be described.

The fulfillment network 133 comprises a network of warehouses and stores that facilitate multi-channel delivery to customers. In this sense, "multi-channel delivery" refers to the fact that the fulfillment network 133 provides for the delivery of goods to customers either by direct shipment to a destination address or location of the customer, or by virtue of shipment to a store specified by the customer for pickup. If a customer chooses store delivery, then the customer is responsible for traveling to the store to pick up the product when it is received by the store for pickup.

The fulfillment network 133 includes one or more warehouses 136, one or more virtual warehouses 139, and one or more stores 143. Also, other facilities may be included in the fulfillment network 133 beyond those shown. Each of the warehouses 139 functions as one or more warehouse types. In one embodiment, there are three different warehouse types. Specifically, the warehouse types may comprise a donor warehouse, a direct warehouse, or a local warehouse. The donor warehouse is denoted by "Do," the direct type of warehouse is denoted with "Di," and the local warehouse is denoted by "Lo."

A given warehouse type indicates the precise capabilities including delivery capabilities of a warehouse 136. Specifically, some warehouses 136 may be capable of direct shipping to any address, whereas others may only be able to ship items to other warehouses 136. Some warehouses 136 may include individual product picking capability, where other warehouses 136 may only be capable of shipping in bulk to various locations. Further, some warehouses 136 may include special capabilities such as gift wrapping of items, special packaging capabilities, special handling capabilities for the handling of awkward items, or other capabilities.

A donor warehouse 136 is a warehouse 136 that is capable of shipping only to other warehouses 136. In this respect, donor warehouses 136 may not include the facilities needed to pack and ship items to destination addresses via public carrier.

According to one embodiment, a direct warehouse 136 is a warehouse 136 with unlimited shipping capability and is capable of shipping via a public carrier to any destination address 146. The destination addresses 146 may be an address associated with a residence of a customer, a business address, or any other type of address to which items may be shipped. Alternatively, the shipping capability of a direct warehouse 136 may be restricted in some manner. For example, even though a direct warehouse 136 may be able to ship to destination addresses 146 via public carrier, it is possible that the shipping capability of a given direct warehouse 136 may be geographically limited in some manner. Specifically, there may be geographical regions to which a direct warehouse 136 cannot ship items even though it physically is able to do so. For example, the destination addresses 146 in some geographical regions may be subject to taxation that undermines the cost effectiveness of shipping to such regions. Also, transportation networks may not be able to reach certain locations. Further, there may be other reasons why a direct warehouse 136 may be restricted from shipping to certain destination addresses 146.

A local warehouse 136 is capable of shipping only to a predefined number of stores 143. In such case, a local warehouse 136 has the primary function of shipping stock to stores 143 to replenish the items on the shelves of the stores 143. The local warehouses 136 may or may not have the capability of shipping single items to the respective stores 143. However, the local warehouse 136 generally is not capable of shipping items to other warehouses 136 as would be the case for a donor type warehouse 136.

It is possible for a single warehouse 136 to comprise any combination of warehouse types. Specifically, a given single warehouse 136 may act as any two or more of a donor warehouse, direct warehouse, and a local warehouse. The various warehouses 136 operate together to fulfill orders placed by customers through the server 103 or to facilitate the purchase of items in the stores 143. By way of example, as shown in FIG. 1, various warehouses 136 can ship items to other warehouses 136, stores 143, and destination addresses 146 as depicted by the various arrows shown.

The local warehouses 136 may at times have difficulty providing single items ordered by a given client to a given store 143 for store delivery to the customer. Specifically, it may be the case that a local warehouse 136 ships bulk items to stores 143. Consequently, it may be the case that personnel of a local warehouse have to access bulk items stored in boxes in order to obtain single items that are to be shipped separately to a respective store 143 for pickup by a customer.

Alternatively, where a bulk shipment of items is to occur to a given one of the stores 143, it may be the case that personnel of the local warehouse 136 may include a notice or other indicator on the bulk container that instructs store personnel to set aside one or more of the items contained in the bulk shipment for pickup in conjunction with purchases made by customers online. Also, a local warehouse 136 might actually send a message to the store 143 instructing store personnel to determine whether an item purchased online is currently sitting on the shelves of the store 143. If such is the case, the personnel at the store could pull the item off the shelves and set it aside for the customer to pick up at their leisure. If such an item is not on the shelves, then the local warehouse 136 may send such item individually or in a bulk shipment to the store 143 to be set aside for the customer.

In addition, the stores 143 can operate as direct and/or donor warehouses 136. Specifically, acting in the capacity of a direct warehouse 136, stores 143 may include the capability of shipping goods directly to destination addresses 146. Also, acting in the capacity of a donor warehouse 136, stores 143 may be able to make transshipments to other stores 143 or other warehouses 136.

A virtual warehouse 139 is not actually a physical location. Rather, the virtual warehouse 139 is an abstraction that is created in order to track the existence of stock that the merchant has rights to sell, but may not actually physically exist in the fulfillment network 133. Such stock items are preordered inventory items that are not yet destined to any one location within the fulfillment network 133 for further distribution to customers. Such stock may contrast with back ordered stock that is already associated with a destination in the fulfillment network 133 to be sent to the customer that ordered such an item. Such stock may currently be in the process of being manufactured and/or delivered, resulting in significant lead times. In any case, generally it is known that such items will be received in the fulfillment network 133 at some point in the future.

Even though such items are not actually physically on hand for delivery, such items may still be made available for purchase through the online presence of the merchant. Associated with each of these items is a lead time that indicates when such items will be available within the fulfillment network 133. The lead time it takes to receive the item that may be the subject of a purchase for a given customer may be used to generate a delivery promise to the customer for the item.

It may be the case that a manufacturer or other source of such items may not be entirely reliable in their delivery of such items. As such, the lead time associated with such items may be adjusted or padded based upon a "surety" factor that is a function of the prior performance of the source of the product and/or other factors. In this manner, then the lead times of items associated with a virtual warehouse 139 may be adjusted for increased accuracy in estimating delivery times for customers with respect to such items.

When inventory items are listed in the virtual warehouse 139 from a given source such as a manufacturer, they may be allocated for distribution to the various physical warehouses 136 within the fulfillment network 133 to be made available to fulfill customer orders. The actual allocation of items that are sent to the respective warehouses 136 may be calculated based upon internal information such as marketing information or other data known to the merchant. These items are allocated in this manner as they are not the subject of specific orders such that there would be a known location in the fulfillment network 133 to which such items are to be sent.

The orders received for items that are maintained in association with a virtual warehouse 139 may be employed in guiding or validating a designated allocation of items to the respective ones of the warehouses 136. When an order is generated for an item associated with the virtual warehouse 139, then the respective fulfillment manifest for such item may direct the "shipment" of the item from the virtual warehouse 139 to a given physical site within the fulfillment network 133 such as one of the warehouses 136. Generally, such items are routed through warehouses 136 that feature the needed capabilities to fulfill the order. Statistical methods or other methods may be employed to calculate the allocation of the delivery of various items associated with a virtual warehouse 139 to the respective warehouses 136 based on the existing orders for such items received while the items are maintained in the virtual warehouse 139 pending delivery from the respective source.

As stated above, inventory data maintained in various systems associated with the fulfillment network 133 is provided to the server 103 in order to aid in the online purchase of items. Various applications in the server 103 may be configured to receive and store such information in the data store 113. The detailed knowledge of the inventory of items stored in the various warehouses 136 and associated with the virtual warehouse 139 facilitates access to such inventory to fulfill orders generated online based upon access and manipulation of respective network pages served up by the server 103 to clients 116.

Given that certain warehouses 136 comprise given warehouse types, it is possible that some inventory stored in some of the warehouses 136 may not be available to fulfill given orders. By virtue of various embodiments, inventory that exists at a given location such as a warehouse 136, or that will ultimately be located at a given location such as items associated with the virtual warehouse 139, are made available for the fulfillment of customer orders received over the Internet. In one embodiment, various applications executed in the server 103 such as the e-commerce application 106 generate fulfillment manifests that are transmitted to the fulfillment network 133 that direct the operation of the fulfillment network 133 in order to fulfill a given order received from the client 116.

It may be the case that the inventory information associated with the warehouses and stores 136/139/143 of the fulfillment network 133 is centralized in a central data processing facility that may use one or more servers or other systems as can be appreciated. Alternatively, the inventory within each of the warehouses 136 or stores 143 may be maintained in distributed data systems. Such distributed data systems may comprise data processing systems that are local to the warehouses 136 and stores 143 as can be appreciated. In any event, the inventory data generated by systems associated with the fulfillment network 133 and sent to the order processing side may be generated by a centralized system or by a distributed system as can be appreciated.

The fulfillment network model stored within the data store 113 may include information about the fulfillment network 133. Such information is used to generate the fulfillment manifests sent to various systems of the fulfillment network 133 in order to direct the activity of the fulfillment network 133 in order to implement the fulfillment of various orders received through the online portal. Also, such information may be used to generate a promised delivery date to customers who purchase items through the online portal.

The fulfillment network model data includes information about the operation of the fulfillment network 133. For example, within each of the warehouses 136, various actions may be performed with respect to items stored therein based upon the one or more warehouse types associated with the respective warehouse 136. For each action, there may be a cost associated therewith. For example, some warehouses 136 may include a pick capability in which individual pickers may move throughout the facility and pick various items off of shelves or from bins to be shipped to customers or other warehouses 136. A "pick cost" may be associated with the action of picking such items. The pick cost may vary depending upon the type of item that is picked. For example, a pick cost associated with large bulky items requiring multiple pickers or the use of materials handling equipment may be greater that the pick cost for small items that may be placed in a bucket or other container carried by an individual picker.

Also, where a given warehouse 136 such as a local-type warehouse is not equipped for the picking of individual items, a pick cost associated with items in such warehouses 136 might be greatly increased. Generally, the cost for picking items in warehouses 136 may be calculated using any number of ways as can be appreciated.

Another cost that may be experienced with respect to the operation of warehouses 136 is a "pick-to-manifest cost." The pick-to-manifest cost involves the cost of preparing one or more items for shipment after they have been picked from a bin or shelf. Such costs may include the cost of packing such items into boxes or appropriate packaging, and any other costs associated with readying such items for shipment. In addition, the fulfillment network 133 takes into account transit costs associated with the shipping of items between warehouses 136, between a warehouse 136 and a store 143, or between a warehouse 136 and a destination address 146. The fulfillment network model will include information about each of the costs associated with the operation of the various sites of the fulfillment network 133.

The fulfillment network model associated with the fulfillment network 133 may also include the time it takes to conduct the various actions implemented into the warehouses 136. For example, it may take a certain amount of time in order to pick an item from a given bin or shelf in a given warehouse 136. Specifically, it may be the case that items to be picked are placed in a queue that is processed by pickers in the order received, resulting in a waiting period depending upon order processing latency. Also, a "pick-to-manifest time" may be specified for the time period that it takes to process a given item once it has been picked from a shelf or bin to the point where it is ready for a carrier to ship such item to a given location. The pick-to-manifest time may include the time it takes to package an item as can be appreciated. In addition, the fulfillment network model includes transit times associated with the shipping of items between warehouses 136 or from warehouses 136 to stores 143, etc.

With respect to transit times, it may be the case that transportation schedules are employed in which trucks or other vehicles are scheduled to leave various facilities at given times in order to transport goods from one point to another. Thus, even though a pick-to-manifest time may be specified, it may also be the case that an item may sit on a loading dock after the pick-to-manifest time has completed waiting for a truck to arrive according to given schedule in order to load such item onto the truck and ship it to the respective destination. Thus, the fulfillment network model includes any relevant transportation schedules associated with the operation of the fulfillment network 133.

The fulfillment network modeling data further includes special capabilities or operational constraints associated with the respective warehouses 136 or 139. For example, some warehouses 136 may include special packaging capabilities such as sensitive items, fragile items, items that must be maintained at given temperatures, or other packaging capabilities. Also, such capabilities may include gift wrapping, or awkward handling capabilities. Awkward handling capabilities may involve the handling of items that may be large, fragile, or have other characteristics that require additional capability or expertise.

For example, some items such as large screen televisions and the like might require specialized training for proper handling in a warehouse 136. Other items might not require special training, but may be extremely large and require multiple pickers to handle such items. The handling of still other items may require the use of specialized materials handling equipment. Thus, any awkward handling capabilities associated with a given one of the warehouses 136 may be noted as the special capabilities and operational constraints that are included in the fulfillment network model data.

Further, some warehouses 136 or stores 143 may only be capable of making bulk shipments of items to other warehouses 136, stores 143, or destination addresses 146. Also, some warehouses 136 or stores 143 may or may not include the capability of receiving, storing, and shipping hazardous materials, etc.

In addition, in the fulfillment network 133, the inventory of each respective item is maintained in appropriate inventory control systems that are either centralized or distributed throughout the fulfillment network 133. Such inventory items are stored temporarily in the various warehouses 136 as they make their way to the stores 143 to be purchased or are shipped directly to destination addresses 146 of customers. Also, such items may be sent to the stores 143 for pickup by customers who purchase such items online as described above. The inventory items themselves may be tracked throughout the fulfillment network 133 using inventory control systems that track items based upon various identifiers such as a Stock Keeping Unit (SKU), Universal Product Code (UPC), European Article Number (EAN), and/or Global Trade Item Number (GTIN). Additionally, inventory items may be tracked throughout the fulfillment network 133 based on product serial numbers or lot numbers in addition to the various identifiers set forth above.

With the use of such identification information, a merchant may use inventory control systems to systematically track their inventory in the warehouses 136 and the stores 143. Alternatively, other means may be employed to track items within the inventory that include appropriate identifiers as can be appreciated. Generally, the inventory information provided to the server 103 by the fulfillment network 133 comprises the various product identifiers and the quantities of such products in the respective warehouses 136, stores 143, or other locations, and any other pertinent information.

During the process of ordering items for purchase through the server 103, the e-commerce application 106 or other applications may generate various network pages that are served up to the client 116 as the client 116 navigates their way through the process of ordering items for purchase. During the process of serving up network pages to the client 116, the e-commerce application 106 may access inventory information and the fulfillment network model data stored in the data store 113 in order to provide various information to the customer manipulating the client 116.

Such information may comprise, for example, the quantity of a given item that is available in inventory in the fulfillment network 133 that can be purchased and ultimately delivered to the customer. The e-commerce application 106 facilitates the taking of an online order for goods from the client 116. During the process of generating such an order, the customer manipulating the client 116 may select a desired shipping method to be employed in delivering the item to the customer where the customer wishes to have the item shipped to a specific destination address 146. Alternatively, the customer may specify that the item be delivered to a given store 143 to which the customer will travel to pick up the item. Many customers may wish to pick up items from stores 143 rather than having items delivered directly to their destination address 146 as it gives customers the opportunity to return such items if they are dissatisfied with such items when they actually receive it in the store 143.

Also, a customer may specify the precise shipping method to be employed when ordering a given item that is to be delivered to a destination address 146. Where the item is to be picked up in a store 143, then the shipping methods established for the fulfillment network 133 are used. Once the order has been consummated between the server 103 and the client 116, the e-commerce application 106 or other application within the server 103 determines how to fulfill the order based upon the information received from the customer such as the desired shipping method, etc., and based upon the fulfillment network model data and inventory data stored within data store 113 that is associated with the fulfillment network 133.

The instructions as to how to fulfill the order are included in a fulfillment manifest that describes precisely how the fulfillment network 133 is to fulfill the order. In particular, the fulfillment manifest may describe how and where the item is to be handled and shipped within the fulfillment network 133 that ultimately results in the ordered item reaching a given store 143 or a destination address 146 as requested by the customer. The inventory control systems and fulfillment control systems associated with the fulfillment network 133 implement the fulfillment manifest in order to effect the fulfillment of the order.

In addition, the e-commerce application 106 or other application within the server 103 may promise an approximate or exact delivery time for an item to a customer during the course of an online purchase. Specifically, a delivery time for a given item comprises the time that it takes for the item to be received by the customer after the order is submitted, whether the item is received at a given destination address 146 or a store 143. Such time may include a "pad" time plus a transit time associated with the delivery of the item.

The "pad" time is the time that it takes to prepare the order for dispatch before the item is shipped to the endpoint such as to the destination address 146 of the customer or to a store 143. The transit time is the time that the item is in transit to the endpoint such as the destination address 146 or a store 143 once the item leaves a facility of the fulfillment network 133 by way of a public carrier. Thus, the pad time may comprise all of the times inherent in moving an item between warehouses 136 as well as the time it takes to perform the necessary internal operations within warehouses 136 as described above.

For example, assume that an item sits in a donor type warehouse 136 to be delivered to a destination address 146. The pad time would include the pick time and the pick-to-manifest time in the donor type warehouse 136, the transit time between the donor type warehouse 136 and a direct type warehouse 136, the packaging time in the direct type warehouse 136, and any other times for other actions to be performed along the way. Thus, ultimately the pad time is the time it takes for the item to reach a point of dispatch where it is ready for shipment to an endpoint such as a destination address 146 or a store 143 for customer pickup.

In some cases, an estimate of a delivery time is provided or given in terms of a promise to a customer during the order process. The delivery time or promise may be provided in the form of the pad time or time that it takes to ready the product for dispatch within fulfillment network 133, and the time it takes for the common carrier to ship the item from the pickup point in the fulfillment network 133 to the destination address 146. In some situations, the times may be expressed in terms of a range. For example, for a given item, it may be estimated to take from 3 to 5 days to ship the item out of the fulfillment network 133 on its way to the destination address 146. Also, the public carrier may have a range of days within which the item may be in transit on the way to the destination address 146 based on the performance of the public carrier. Ultimately, the data in the fulfillment network model facilitates the generation of a promised delivery time that may be provided to the customer during the order process. However, given that the estimate of the delivery times (i.e. pad times and transit time) may need to be calculated rather quickly during the order process, there may not be time to review all of the data included in the fulfillment network model. Consequently, the promised delivery time may be generated based upon more generalized data associated with the fulfillment network 133. The specific information included in the fulfillment network model may be used to determine the most optimum way to fulfill a given order to meet the estimate of the delivery time promised to a customer.

In any event, in order to give a delivery time to the customer for the order, the estimates of pad times and delivery times may be provided to the customer in the form of ranges of times. Specifically, a customer may be told that an item will ship from a given warehouse 136 in 3 to 5 days, and will take anywhere from 5 to 7 days in transit to the destination address 146, which results in a total delivery time of 8 to 12 days.

Figure 2:
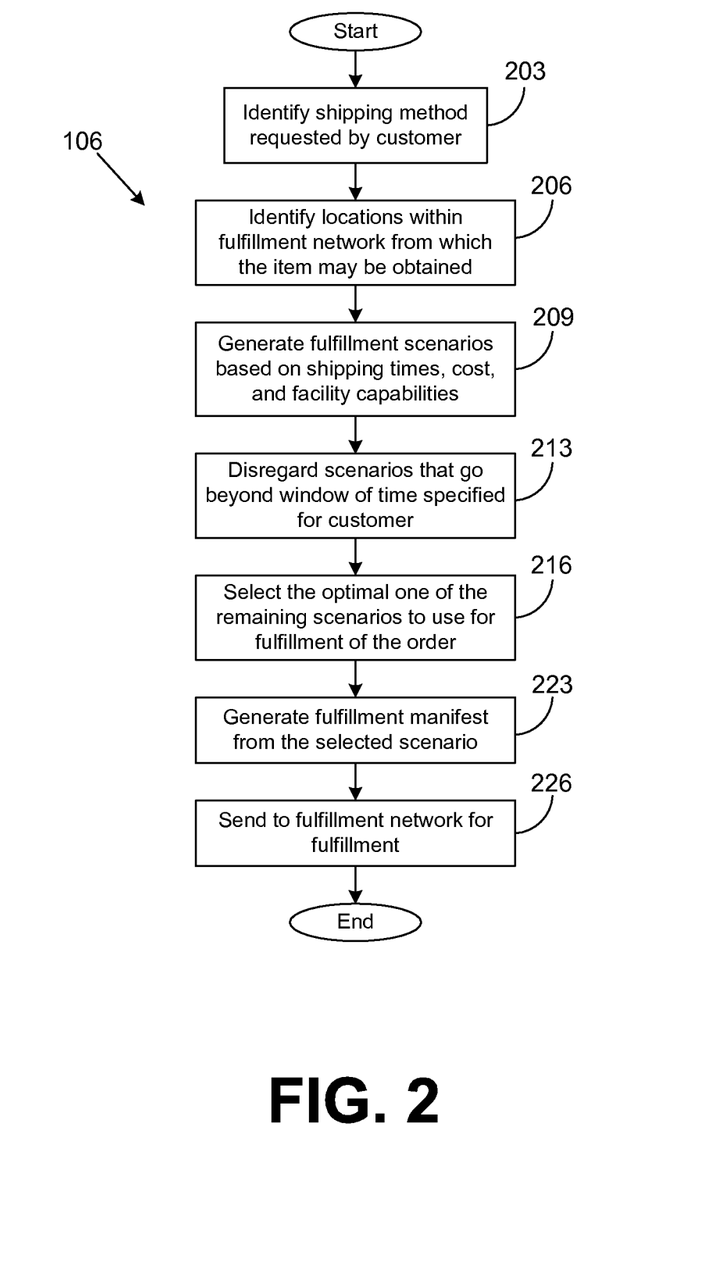
FIG. 2 is a flow chart that shows one example of the operation of an application that generates a fulfillment manifest for order fulfillment in a fulfillment network associated with the product purchase system of FIG. 1 according to an embodiment of the present disclosure.

With reference to FIG. 2, shown is a flow chart that provides one example of the operation of components of the e-commerce application 106 or other application implemented in the server 103 for the optimization of the fulfillment of a given order in view of a fulfillment network model and inventory data stored within the data store 113. Alternatively, the flow chart of FIG. 2 may be viewed as depicting steps of an example of a method implemented in the server 103. In this respect, the flowchart may comprise a portion of the e-commerce application 106 or other application. In this respect, the functionality of the flowchart of FIG. 2 may be implemented using any one of a number of different programming languages, such as, for example, C, C++, JAVA, or other programming languages as can be appreciated.

Beginning with box 203, the shipping method requested by the customer is identified in association with the order. Thereafter, in box 206, the locations within the fulfillment network 133 from which the item may be obtained are identified. This may be determined by examining the inventory data most recently received from the fulfillment network 133 that is stored in the data store 113. Then, in box 209, one or more fulfillment scenarios are generated based upon the information associated with the fulfillment network model such as shipping times, action costs, facility capabilities, and any other information as described above.

The scenarios may vary widely depending upon where items are located in the fulfillment network 133 and where the items are ultimately to be delivered. For example, in one scenario, a customer may wish to have an item delivered to a given destination address 146 such as their home or work address via a public carrier. If the item ordered resides in a direct type warehouse 136, then the item may be immediately packed and shipped from the direct warehouse 136 to the destination address 146.

In an alternative scenario, a customer may wish to have an item delivered to a destination address 146, however the item may reside only in a donor warehouse 136. In such case, the item may be transferred from the donor warehouse to a direct warehouse 136 where it is packaged and shipped via a public carrier to the destination address 146.

In an additional alternative, a customer may wish to have an item delivered to a store 143. Assume that the item ordered by the customer is only available in a donor type warehouse 136. In such case, the item would be shipped from the donor type warehouse 136 to a local warehouse 136 associated with the store 143. The item may be then transmitted from the local warehouse 136 to a respective store 143 designated by the customer in the order.

In an additional scenario, a customer may wish to have an item purchased shipped to a given store 143. Assume that the item ordered by the customer is available in a local warehouse 136 associated with the store 143 selected by the customer. The item may be added to a shipment from the local warehouse 136 to the respective store 143 to be delivered ahead of collection by the customer.

In a further scenario, assume that a given warehouse 136 acts as a direct warehouse 136 that also includes gift wrapping capability. Further assume that a customer has ordered an item to be delivered to a destination address 146 and to be gift wrapped. However, further assume that the item is stored in a donor type warehouse 136 and not in the direct type warehouse 136. As such, the item will be transferred from the donor type warehouse 136 to the direct type warehouse 136 where it will be gift wrapped and packaged for shipment to the destination address 146. It may be the case that other direct type warehouses 136 might be able to ship the item to the destination address 146, but may not include the gift wrapping capability. As such, such warehouses 136 would not qualify for use in fulfillment of the given order that required gift wrapping unless they could act as a donor type warehouse 136.

In still another scenario, an item ordered may be "warehoused" in the virtual warehouse 139. Such a scenario may involve "shipment" from the virtual warehouse 139 to a respective warehouse 136 for further fulfillment. Assume for example that the item ordered is to be shipped to a given destination address 146. In such case, the item is "shipped" from the virtual warehouse 139 to a direct type warehouse 136 that further packages the item and ships the same to the destination address 146. In such case, the fulfillment of such item will involve allocating the item to be shipped to the respective direct type warehouse 136 when it is received from the source such as a manufacturer or other source. Thereafter, the item would be packed and shipped to the destination address 146.

Note that it may be the case that multiple items may be shipped to a given store 143 or destination address 146. As such, such multiple items may be shipped together or separately as the case may be.

There may be many fulfillment scenarios for a given item depending upon the inventory stored within the fulfillment network 133, the costs inherent in the operation of the various component sites of the fulfillment network 133, the capabilities of the various component sites of the fulfillment network 133, and other factors. Once all of the possible fulfillment scenarios are determined in box 209, then in box 213, all those scenarios that would result in a delivery time that extends beyond the estimated delivery time promised to the customer are disregarded.

Next, in box 216, an optimal one of the remaining scenarios is selected for use for the fulfillment of the order based upon criteria determined by the merchant. To this end, the optimal one of the scenarios may comprise the one scenario that provides the shortest delivery time to the customer. Alternatively, it may be deemed that the least expensive scenario be used. If no scenarios can result in delivery of the item within the time promised to the customer, then the next best scenario from those disregarded in box 213 may be employed. Then, in box 223, a fulfillment manifest is generated based upon the selected scenario. Thereafter, in box 226, this fulfillment manifest is transmitted to appropriate systems associated with the fulfillment network 133 to implement the fulfillment of the order. Thereafter, the flow chart of FIG. 2 ends as shown.

In determining an optimal one of the scenarios that is to be employed in generating the respective fulfillment manifest for the fulfillment of an order, one constraint may be imposed in which the estimated delivery time to the customer is protected above all else. In this respect, direct shipping may be used to transmit the item or items to a store 143 or destination address 146 of a customer if need be, even if such direct shipping is much more expensive than other alternative methods that may take too long.

For example, where inventory resides in a local warehouse 136 that would take too long to pick and send to a respective store 143, then an alternative approach may be used in which the same item may be picked in a direct warehouse 136 and shipped directly to the store 143, even though such a shipment would be more expensive than a shipment sent from the local warehouse 136 directly to the store 143. Also, in cases where there are no fulfillment scenarios that meet the delivery time requested by a customer, then a fulfillment scenario that most closely meets customer requirements may be employed. In this respect, the fulfillment is still possible even though shipping times expected by the customer are not necessarily met.

Figure 3:
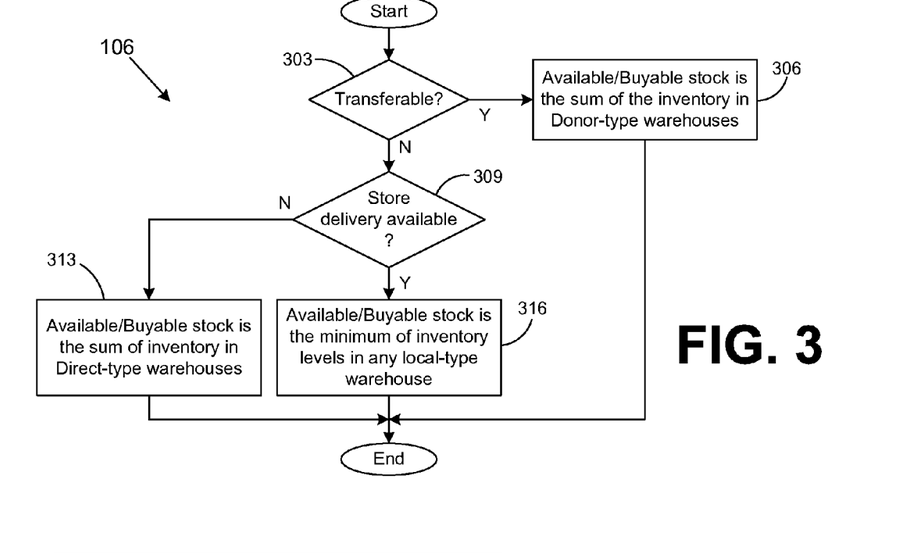
FIG. 3 is a flow chart that illustrates one example of determining the buyable stock of an item in the fulfillment network in the product purchase system of FIG. 1 according to an embodiment of the present disclosure.

With reference then to FIG. 3, from time to time the e-commerce application 106 (FIG. 1) may generate network pages that are served up to clients 116 (FIG. 1) during the course of an ordering process in which products are listed from which the customer may select items to purchase. In addition to the display of information about the products themselves, a number of available items in stock may be displayed so that a user can determine whether there are enough of the items for them to purchase. Alternatively, the user can be informed whether enough stock is on hand to fulfill the order when the user specifies a given quantity of an item be placed in a "shopping cart" or "electronic basket." When the items are listed as available, there should be a guarantee that the quantity listed is in fact available.

According to various embodiments, FIG. 3 shows a flowchart that provides one example of a process implemented as a portion of the e-commerce application 106 by which one may determine the quantity of "buyable" stock that may be listed in the web pages in conjunction with the various products viewed by the customer. The "buyable" quantity of stock is that amount of stock of a given item in the fulfillment network 133 that is available for purchase for customers that can be ultimately shipped or otherwise provided to the customer. During the order process, it is desirable to generate the total number of buyable items very quickly during the generation of a respective network page that lists products for a customer to select for purchase.

However, at such time it is unknown where such items are to be delivered or where such items exist in the fulfillment network 133 when generating a quantity of buyable stock. In order to come up with a number for the buyable stock, the flowchart of FIG. 3 may be implemented for each item as identified by a respective SKU or other identifier as set forth below. In this respect, the flowchart of FIG. 3 may be viewed as depicting the operation of an appropriate application in the server 103. Alternatively, the flow chart of FIG. 3 may be viewed as depicting steps of a method implemented to determine a buyable quantity of stock.

Beginning with box 303, it is first determined whether the item in question is transferable. For example, some items are not transferable, such as very small items that are subject to being lost or very expensive and valuable items such as jewelry that are subject to being stolen during transport between warehouses 136. In this sense, an item is "transferable" if it is subject to movement between a donor type warehouse 136 to another warehouse 136 (i.e. a transshipment). Such movement does not include shipments from local type warehouses 136 to stores 143 as presumably such shipments are more secure. Ultimately, such items may need to be shipped directly to the customer destination address 146 or need to be picked up in a store 143 without experiencing transshipment in the fulfillment network 133.

If it is determined that an item is transferable in box 303, then in box 306, the available or buyable stock is calculated as the sum of the inventory in all donor-type warehouses 136. This reflects the fact that such inventory can be transferred amongst all of the warehouses on the way to being provided to a customer by way of shipment to a destination address 146 or ultimate shipment to a store 143 for pickup. Thereafter, the flowchart ends as shown.

Referring back to box 303, if the item is not transferable, then in box 309 it is determined whether store 143 delivery is available for the item in question. If not, then in box 313 the available or buyable stock is calculated as the sum of the inventory in all direct type warehouses 136. This reflects the case that the only movement of such items that can occur is to direct ship such items to the destination address 146 of a respective customer. That is to say, there is no movement performed between the respective warehouses 136 due to the high risk of loss. Thereafter, the flowchart of FIG. 3 ends.

Referring back to box 309, if store delivery is available for a nontransferable item, then in box 316, the available or buyable stock is calculated as the minimum of inventory levels of any one of the local type warehouses 136. This reflects the fact that the local warehouses 136 can only ship to their respective stores 143 and can do so in a secure manner to ensure that the valuable items that are purchased by the customer reach the store 143 in question and are available for pickup without risk of loss. Thereafter, the flowchart of FIG. 3 ends as shown.

Figure 4:
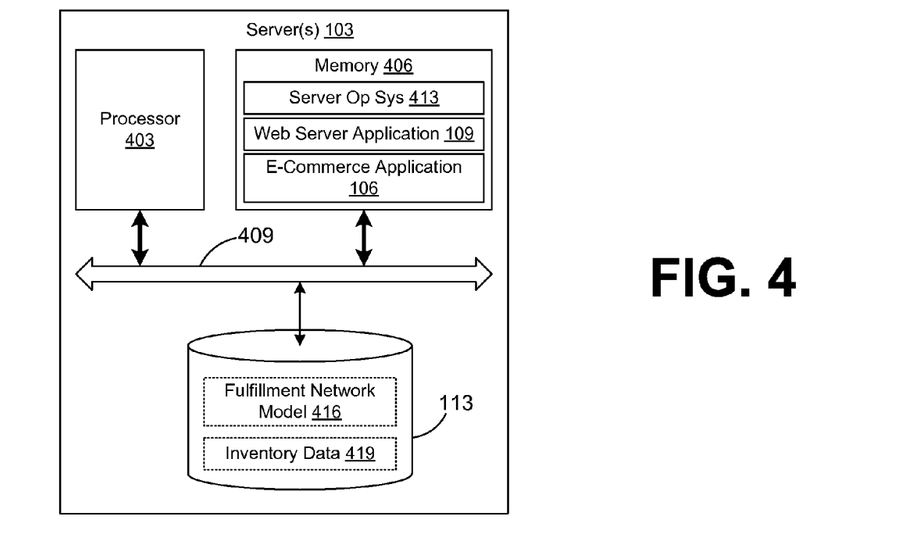
FIG. 4 is a schematic block diagram that illustrates one example of a server employed in the product purchase system of FIG. 1 according to an embodiment of the present disclosure.

Referring next to FIG. 4, shown is an example of one embodiment of the one or more servers 103 according to various embodiments. The server 103 may include a processor circuit having a processor 403 and a memory 406, both of which are coupled to a local interface 409. The local interface 409 may comprise, for example, a data bus with an accompanying control/address bus as can be appreciated. To this end, each server 103 may comprise, for example, a server computer system or other system with like capability.

Various components may be stored in the memory 406 and are executable by the processor 403 including, for example, a server operating system 413, the web server application 109, and the e-commerce application 106. In addition, other applications may be stored in the memory 406 and executable by the processor 403 as can be appreciated. Data that comprises the fulfillment network model 416 and the inventory data 419 may be stored in the data store 113 that is accessible by the processor circuit of the server 103 so as to access the various data stored therein. Alternatively, the data store 113 may be stored in locations other than within the server 103.

With reference to FIGS. 1-4, various components are described such as the subject matter of FIGS. 2 and 3 that may be stored in a memory such as the memory 406 and are executable by a processor such as the processor 403. In this respect, the term "executable" means a program file that is in a form that can ultimately be run by the processor 403. Examples of executable programs may be, for example, a compiled program that can be translated into machine code in a format that can be loaded into a random access portion of the memory and run by the processor 403, or source code that may be expressed in proper format such as object code that is capable of being loaded into a of random access portion of the memory 406 and executed by the processor 403, etc. An executable program may be stored in any portion or component of the memory 406 including, for example, random access memory, read-only memory, a hard drive, compact disk (CD), floppy disk, or other memory components. Also, a single processor as contemplated herein may represent multiple processors operating in parallel, etc.

A memory such as the memory 406 is defined herein as both volatile and nonvolatile memory and data storage components. Volatile components are those that do not retain data values upon loss of power. Nonvolatile components are those that retain data upon a loss of power. Thus, a memory may comprise, for example, random access memory (RAM), read-only memory (ROM), hard disk drives, floppy disks accessed via an associated floppy disk drive, compact discs accessed via a compact disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

In addition, the subject matter of FIGS. 1-4 may be embodied in software or code executed by general purpose hardware. Alternatively, the same may also be embodied in dedicated hardware or a combination of software/general purpose hardware and dedicated hardware. If embodied in dedicated hardware, the same can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc.

The flow charts of FIGS. 2 and 3 show functionality as described above. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor in a computer system or other system. The machine code may be converted from the source code, etc. If embodied in hardware, each block may represent a circuit or a number of interconnected circuits to implement the specified logical function(s).

Although the flow charts of FIGS. 2 and 3 show a specific order of execution, it is understood that the order of execution may differ from that which is depicted. For example, the order of execution of two or more blocks may be scrambled relative to the order shown. Also, two or more blocks shown in succession in FIGS. 2 and 3 may be executed concurrently or with partial concurrence. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present invention.

Also, where the subject matter of FIGS. 1-4 comprises software or code, it can be embodied in any computer-readable medium for use by or in connection with an instruction execution system such as, for example, a processor in a computer system or other system. In this sense, the logic may comprise, for example, statements including instructions and declarations that can be fetched from the computer-readable medium and executed by the instruction execution system. In the context of the present invention, a "computer-readable medium" can be any medium that can contain, store, or maintain the subject matter of FIG. 2 or 3 for use by or in connection with the instruction execution system. The computer readable medium can comprise any one of many physical media such as, for example, electronic, magnetic, optical, electromagnetic, infrared, or semiconductor media. More specific examples of a suitable computer-readable medium would include, but are not limited to, magnetic tapes, magnetic floppy diskettes, magnetic hard drives, or compact discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure.

The invention claimed is:

1. A method, comprising the steps of:
maintaining a fulfillment network model in at least one server, the fulfillment network model comprising an abstraction of a physical fulfillment network operated by a merchant, the physical fulfillment network being configured for multi-channel delivery;
storing inventory data received from the merchant in the at least one server, the inventory data indicating amounts of a plurality of inventory items stored in the physical fulfillment network;
maintaining an e-commerce application for the merchant on the at least one server;
generating an order for at least one of the inventory items in the e-commerce application based upon interaction with a client; and
generating a fulfillment manifest based upon the fulfillment network model, the fulfillment manifest identifying an optimal one of a plurality of fulfillment scenarios to be implemented in the physical fulfillment network to implement fulfillment of the order, wherein the fulfillment scenarios incorporate a preparation time for preparing the at least one of the inventory items for dispatch, wherein the preparation time further comprises a pick-to-manifest time and an internal transportation time, wherein the pick-to-manifest time is a period of time needed to pick the at least one of the inventory items from the inventory and ready the at least one of the inventory items for shipment, wherein the internal transportation time is based at least in part on a transportation schedule for a plurality of vehicles to transport the at least one of the inventory items between a plurality of sites in the physical fulfillment network, wherein the fulfillment manifest is generated based in part upon a delivery capability of respective ones of the plurality of sites in the physical fulfillment network from the fulfillment network model, wherein the delivery capability is chosen from options of:
limited to delivering to another site in the physical fulfillment network;
limited to delivering the at least one of the inventory items to a physical store; and
unlimited.

2. The method of claim 1, further comprising the step of directing the merchant to deliver the at least one of the inventory items from a direct warehouse in the physical fulfillment network to a destination address in the fulfillment manifest.

3. The method of claim 1, further comprising the step of directing the merchant to deliver the at least one of the inventory items stored in the physical fulfillment network to a physical store in the physical fulfillment network for pickup by a customer.

4. The method of claim 1, further comprising the step of determining in the e-commerce application a quantity of buyable stock of the at least one of the inventory items in the physical fulfillment network based upon the inventory data.

5. A system, comprising:
a fulfillment network model maintained in at least one server, the fulfillment network model comprising an abstraction of a physical fulfillment network operated by a merchant, the physical fulfillment network being configured for multi-channel delivery; and
an e-commerce application for the merchant implemented on the at least one server, the e-commerce application being configured to:
facilitate a generation of an order for an inventory item based upon interaction with a client; and
generate a fulfillment manifest based upon the fulfillment network model, the fulfillment manifest identifying an optimal one of a plurality of fulfillment scenarios to be implemented in the physical fulfillment network to implement fulfillment of the order, wherein the fulfillment scenarios incorporate a preparation time for preparing the inventory item for dispatch, wherein the preparation time further comprises a pick-to-manifest time and an internal transportation time, wherein the pick-to-manifest time is a period of time needed to pick the inventory item from inventory and ready the inventory item for shipment, wherein the internal transportation time is based at least in part on a transportation schedule for a plurality of vehicles to transport the inventory item between a plurality of sites in the physical fulfillment network, wherein the fulfillment manifest is generated based in part upon a delivery capability of respective ones of a plurality of sites in the physical fulfillment network from the fulfillment network model, wherein the delivery capability is chosen from options of:
limited to delivering to another site in the physical fulfillment network;
limited to delivering the inventory item to a physical store; and
unlimited.

6. A system, comprising:
a fulfillment network model maintained in at least one server, the fulfillment network model comprising an abstraction of a physical fulfillment network operated by a merchant, the physical fulfillment network being configured for multi-channel delivery; and
an e-commerce application for the merchant implemented on the at least one server, the e-commerce application being configured to:
facilitate a generation of an order for an inventory item based upon interaction with a client;
generate a fulfillment manifest based upon the fulfillment network model, the fulfillment manifest identifying at least one action to be taken in the physical fulfillment network to implement fulfillment of the order;
identify a plurality of locations within the physical fulfillment network where the inventory item is stored;
generate a plurality of fulfillment scenarios for the fulfillment of the order based on the locations at which the inventory item is stored, wherein the fulfillment scenarios incorporate a preparation time for preparing the inventory item for dispatch, wherein the preparation time further comprises a pick-to-manifest time and an internal transportation time, wherein the pick-to-manifest time is a period of time needed to pick the inventory item from inventory and ready the inventory item for shipment, wherein the internal transportation time is based at least in part on a transportation schedule for a plurality of vehicles to transport the inventory item between a plurality of sites in the physical fulfillment network; and select an optimal one of the fulfillment scenarios for fulfillment of the order, where the fulfillment manifest is generated based upon the selected one of the scenarios and in part upon a delivery capability of respective ones of the plurality of sites in the physical fulfillment network from the fulfillment network model, wherein the delivery capability is chosen from options of:

limited to delivering to another site in the physical fulfillment network;

limited to delivering the inventory item to a physical store; and unlimited.

7. The system of claim 6, where the e-commerce application is further configured to disregard the fulfillment scenarios that result in a delivery time that is greater than a predefined window when generating the fulfillment scenarios for the fulfillment of the order.

8. The system of claim 5, where the physical fulfillment network services a plurality of physical stores.

9. The system of claim 5, where the fulfillment manifest directs that the inventory item be delivered from a direct warehouse in the physical fulfillment network to a destination address, where the direct warehouse is capable of shipping directly to the destination address.

10. The system of claim 5, where the fulfillment manifest directs that the inventory item stored in the physical fulfillment network be delivered to a physical store in the physical fulfillment network for pickup by a customer.

11. The system of claim 5, where the e-commerce application is further configured to determine a quantity of buyable stock of an inventory item in the physical fulfillment network.

12. The system of claim 11, where a delivery capability of at least one of the sites is limited to delivery to a physical store, the buyable stock of the inventory item comprising an inventory in one of the at least one of the sites.

13. The system of claim 11, where a delivery capability of at least one of the sites is unlimited, the buyable stock of the inventory item comprising an inventory in the at least one of the sites.

14. The system of claim 5, further comprising inventory data stored in the at least one server received from the merchant, the inventory data indicating amounts of inventory item stored in the physical fulfillment network.

15. The system of claim 14, where a delivery capability of at least one of the sites is limited to a predefined channel.

16. The system of claim 15, where the delivery capability of the at least one site is limited to delivering to another site in the physical fulfillment network.

17. The system of claim 15, where the delivery capability of at least one of the sites is unlimited.

18. The system of claim 15, where the delivery capability of the at least one site is limited to delivering the inventory item to a physical store.

19. The system of claim 5, further comprising a virtual site associated with the physical fulfillment network, the virtual site tracking an inventory of preordered inventory items to be received in the physical fulfillment network.

20. The system of claim 19, where the preordered items are not the subject of an order to be fulfilled.

21. The system of claim 19, where the e-commerce application is further configured to facilitate a generation of at least one order for at least one of the inventory items tracked in the virtual site.

22. The system of claim 21, where the at least one order for the at least one of the inventory items tracked in the virtual site is supplied to the merchant to aid in an allocation of the inventory of preordered items when received to the plurality of sites in the physical fulfillment network.

23. A method, comprising the steps of:

maintaining a fulfillment network model in at least one server, the fulfillment network model comprising an abstraction of a physical fulfillment network operated by a merchant, the physical fulfillment network being configured for multi-channel delivery;

maintaining an e-commerce application for the merchant on the at least one server;

generating an order for an inventory item in the e-commerce application based upon interaction with a client; and generating a fulfillment manifest based upon the fulfillment network model, the fulfillment manifest identifying at least one action to be taken in the physical fulfillment network to implement fulfillment of the order, where the step of generating the fulfillment manifest further comprises the steps of:

identifying a plurality of locations within the physical fulfillment network where the inventory item is stored;

generating a plurality of fulfillment scenarios for the fulfillment of the order based on the locations at which the inventory item is stored, wherein the fulfillment scenarios incorporate a preparation time needed for preparing the inventory item for dispatch, wherein the preparation time comprises:

an internal transportation time, wherein the internal transportation time is based at least in part on a transportation schedule for a plurality of vehicles to transport the at least one of the inventory items between a plurality of sites in the physical fulfillment network; and a pick-to-manifest time, wherein the pick-to-manifest time is a period of time needed to pick the at least one of the inventory items from the inventory and ready the at least one of the inventory items for shipment;

selecting an optimal one of the fulfillment scenarios for fulfillment of the order; and generating the fulfillment manifest based upon the selected one of the scenarios and in part upon a delivery capability of respective ones of the plurality of sites in the physical fulfillment network from the fulfillment network model, wherein the delivery capability is chosen from options of:

limited to delivering to another site in the physical fulfillment network;

limited to delivering the inventory item to a physical store; and unlimited.

24. The method of claim 23, where the step of generating the fulfillment scenarios for the fulfillment of the order further comprises the step of disregarding the fulfillment scenarios that result in a delivery time that is greater than a predefined window.

25. The method of claim 23, further comprising the step of directing the merchant to deliver the inventory item from a direct warehouse in the physical fulfillment network to a destination address in the fulfillment manifest.

26. The method of claim 23, further comprising the step of directing the merchant to deliver the inventory item stored in the physical fulfillment network to a physical store in the physical fulfillment network for pickup by a customer.

27. The method of claim 23, further comprising the step of storing inventory data received from the merchant in the at least one server, the inventory data indicating amounts of the inventory item stored in the physical fulfillment network.

28. The method of claim 27, further comprising the step of determining in the e-commerce application a quantity of buyable stock of an inventory item in the physical fulfillment network based upon the inventory data.

29. The method of claim 28, where a delivery capability of at least one of the sites is limited to delivery to a physical store, wherein the step of determining in the e-commerce application the quantity of buyable stock of the inventory item in the physical fulfillment network based upon the inventory data further comprises identifying a lowest quantity of the buyable stock of the inventory item in a respective one of the at least one of the sites.

30. The method of claim 28, where a delivery capability of at least one of the sites is unlimited, wherein the step of determining in the e-commerce application the quantity of buyable stock of the inventory item in the physical fulfillment network based upon the inventory data further comprises identifying a quantity of the buyable stock of the inventory item in the at least one of the sites.

31. The method of claim 27, where the step of generating the fulfillment manifest based upon the fulfillment network model further comprises the step of determine a delivery capability of at least one of the plurality of sites in the physical fulfillment network from the fulfillment network model.

32. The method of claim 31, where the delivery capability of the at least one of the sites is limited to delivering to another site in the physical fulfillment network.

33. The method of claim 31, where the delivery capability of at least one of the sites is unlimited.

34. The method of claim 31, where the delivery capability of the at least one of the sites is limited to delivering the inventory item to a physical store.

35. The method of claim 23, further comprising the step of tracking a quantity of preordered inventory items to be received in the physical fulfillment network in a virtual site associated with the physical fulfillment network maintained in the server.

36. The method of claim 35, where the step of generating the order for the inventory item in the e-commerce application based upon interaction with the client further comprises the step of generating an order for at least one of the inventory items tracked in the virtual site.

37. The method of claim 36, further comprising the step of supplying the order for the at least one of the inventory items tracked in the virtual site to the merchant to aid in an allocation of the inventory of preordered items when received to a plurality of sites in the physical fulfillment network.

* * * * *

UNITED STATES PATENT AND TRADEMARK OFFICE
CERTIFICATE OF CORRECTION

PATENT NO.        : 8,527,373 B1                          Page 1 of 1
APPLICATION NO.   : 12/132729
DATED             : September 3, 2013
INVENTOR(S)       : Christian M. Ricci et al.

It is certified that error appears in the above-identified patent and that said Letters Patent is hereby corrected as shown below:

In the Claims

Claim 14, Column 17, line 51, delete the word "item" and insert --items-- to read as follows: --items stored in the physical--

Claim 31, Column 20, line 3, delete the word "determine" and insert --determining-- to read as follows: --the step of determining a delivery--

Signed and Sealed this
Thirty-first Day of March, 2015

Michelle K. Lee
*Director of the United States Patent and Trademark Office*